United States Patent
Boyle et al.

(10) Patent No.: US 9,444,858 B1
(45) Date of Patent: *Sep. 13, 2016

(54) METHOD AND SYSTEM FOR SELF-REGULATING CONTENT DOWNLOAD (71) Applicant: Joingo, LLC, San Jose, CA (US)

(72) Inventors: Stephen S. Boyle, Lincoln, CA (US); Thang Dao, San Jose, CA (US)

(73) Assignee: Joingo, LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/708,215

(22) Filed: May 9, 2015

Related U.S. Application Data (63) Continuation of application No. 13/790,844, filed on Mar. 8, 2013, now Pat. No. 9,055,387.

(60) Provisional application No. 61/651,166, filed on May 24, 2012.

(51) Int. Cl.
*H04L 29/06* (2006.01)
*H04M 1/725* (2006.01)
*H04L 29/08* (2006.01)

(52) U.S. Cl.
CPC .......... *H04L 65/4023* (2013.01); *H04L 67/32* (2013.01); *H04M 1/72522* (2013.01)

(58) Field of Classification Search
CPC ... H04L 29/06; H04L 67/16; H04L 12/5695; H04H 20/57
USPC ............ 370/392, 331; 455/414.3, 414.2, 418
See application file for complete search history.

(56) References Cited

U.S. PATENT DOCUMENTS

| | | | | |
|---|---|---|---|---|
| 7,277,392 B2* | 10/2007 | Venteicher | .......... | H04L 12/5695 370/237 |
| 7,889,697 B2* | 2/2011 | Chen | ....... | H04L 29/06 370/252 |
| 2005/0265345 A1* | 12/2005 | Chen | ....... | H04L 29/06 370/392 |
| 2007/0082660 A1* | 4/2007 | Smith | ..... | H04L 67/16 455/418 |
| 2007/0133665 A1* | 6/2007 | Litwin | ......... | H04W 48/16 375/219 |
| 2009/0247066 A1* | 10/2009 | Ho | .......... | G06F 17/30905 455/3.06 |
| 2011/0202641 A1* | 8/2011 | Kahn | ..... | H04L 67/322 709/221 |

* cited by examiner

*Primary Examiner* — William Nealon
(74) *Attorney, Agent, or Firm* — Clause Eight IPS; Michael Catania (57) ABSTRACT

A method, system and mobile application for self-regulating content downloads to mobile communication devices is disclosed herein. The invention determines if a network connection to a mobile communication device is a WiFi connection or a cellular connection. The invention utilizes the performance characteristics and the type of network identified to select the quality and the quantity of DLC to download onto the mobile communication device from the content server.

4 Claims, 7 Drawing Sheets

METHOD AND SYSTEM FOR SELF-REGULATING CONTENT DOWNLOAD

CROSS REFERENCES TO RELATED APPLICATIONS

The present application is a continuation application of U.S. patent application Ser. No. 13/790,844, filed on Mar. 8, 2013, which claims priority to U.S. Provisional Patent Application No. 61/651,166, filed on May 24, 2012, both of which are hereby incorporated by reference in their entireties.

STATEMENT REGARDING FEDERALLY SPONSORED RESEARCH OR DEVELOPMENT

Not Applicable

BACKGROUND OF THE INVENTION

1. Field of the Invention

The present invention generally relates to wireless content transfers to a mobile communication device. More specifically, the present invention relates to a method and system for a mobile communication device to self regulate content downloads.

2. Description of the Related Art

Most mobile communication devices are able receive content downloads over a cellular network or over a WiFi network. The quality, speed and pricing can vary depending on the network.

General definitions for terms utilized in the pertinent art are set forth below.

APP is a software application for a mobile phone such as a smart phone.

Application Programming Interface (API) is a collection of computer software code, usually a set of class definitions, that can perform a set of related complex tasks, but has a limited set of controls that may be manipulated by other software-code entities. The set of controls is deliberately limited for the sake of clarity and ease of use, so that programmers do not have to work with the detail contained within the given API itself.

BLUETOOTH technology is a standard short range radio link that operates in the unlicensed 2.4 gigaHertz band.

Code Division Multiple Access ("CDMA") is a spread spectrum communication system used in second generation and third generation cellular networks, and is described in U.S. Pat. No. 4,901,307.

CRM (Customer Relationship Management) is a widely-implemented strategy for managing a company's interactions with customers, clients and sales prospects. CRM involves using technology to organize, automate, and synchronize business processes and the like—principally sales activities, but also business processes and the like for marketing, customer service and technical support.

Direct Inward Dialing ("DID") involves a carrier providing one or more trunk lines to a customer for connection to the customer's private branch exchange ("PBX") and a range of telephone lines are allocated to this line.

FTP or File Transfer Protocol is a protocol for moving files over the Internet from one computer to another.

GSM, Global System for Mobile Communications is a second generation digital cellular network.

Hypertext Transfer Protocol ("HTTP") is a set of conventions for controlling the transfer of information via the Internet from a web server computer to a client computer, and also from a client computer to a web server, and Hypertext Transfer Protocol Secure ("HTTPS") is a communications protocol for secure communication via a network from a web server computer to a client computer, and also from a client computer to a web server by at a minimum verifying the authenticity of a web site.

Internet is the worldwide, decentralized totality of server computers and data-transmission paths which can supply information to a connected and browser-equipped client computer, and can receive and forward information entered from the client computer.

Interactive voice response ("IVR") is a telephone technology in which a user uses a phone to interact with a database to acquire information.

Long Term Evolution ("LTE") is a next generation communication network.

Multimedia messaging service ("MMS") communication is a communication transmitted to and from a mobile phone that includes a multimedia content such as a digital photograph (JPEG), videos, and the like.

Mobile Originated ("MO") is a text message that is sent from a mobile phone.

Mobile Terminated ("MT") is a text message that is sent to a mobile phone.

Public Switch Telephone Network ("PSTN") is a telecommunication system in which networks are inter-connected to allow telephones to communicate with each other throughout the world.

Short Message Service ("SMS") is text messaging communication using a mobile phone or other device to send messages up to 160 characters in length.

Short message peer-to-peer ("SMPP") is a telecommunications protocol for exchanging SMS messages between SMS peer entities.

Simple object access protocol ("SOAP") is a computer network protocol for exchanging information.

Simple mail transfer protocol ("SMTP") is a delivery protocol for email.

A SMS aggregator is an entity that provides connectivity with a mobile phone carrier by offering a SMS gateway to send and receive messages and other digital content.

A SMS Gateway is used to send text messages with or without a mobile phone, and is used by aggregators to forward text messages to mobile phones.

Telephone Consumer Protection Act ("TCPA") of 1991 restricts the use of SMS text messages received by mobile phones, and SMS messages sent without a consumer's consent can violate the TCPA.

Transfer Control Protocol/Internet Protocol ("TCP/IP") is a protocol for moving files over the Internet.

Voice over Internet Protocol ("VoIP") relates to communications transmitted over the Internet such as SKYPE.

URL or Uniform Resource Locator is an address on the World Wide Web.

User Interface or UI is the junction between a user and a computer program. An interface is a set of commands or menus through which a user communicates with a program. A command driven interface is one in which the user enter commands. A menu-driven interface is one in which the user selects command choices from various menus displayed on the screen.

Web-Browser is a complex software program, resident in a client computer, that is capable of loading and displaying text and images and exhibiting behaviors as encoded in HTML (HyperText Markup Language) from the Internet, and also from the client computer's memory. Major browsers include MICROSOFT INTERNET EXPLORER, NETSCAPE, APPLE SAFARI, MOZILLA FIREFOX, and OPERA.

Web-Server is a computer able to simultaneously manage many Internet information-exchange processes at the same time. Normally, server computers are more powerful than client computers, and are administratively and/or geographically centralized. An interactive-form information-collection process generally is controlled from a server computer, to which the sponsor of the process has access.

Wireless Application Protocol ("WAP") is an open, global specification that empowers users with mobile wireless communication devices (such as mobile phones) to easily access data and to interact with Websites over the Internet through such mobile wireless communication device. WAP works with most wireless communication networks such as CDPD, CDMA, GSM, PDC, PHS, TDMA, FLEX, reflex, iDEN, TETRA, DECT, DataTAC, Mobitex and GRPS. WAP can be built on most operating systems including PalmOS, WINDOWS, CE, FLEXOS, OS/9, JavaOS and others.

WAP Push is defined as an encoded WAP content message delivered (pushed) to a mobile communication device which includes a link to a WAP address.

The prior art has failed to provide a means for a mobile communication device to self regulate content downloads.

BRIEF SUMMARY OF THE INVENTION

The present invention is provides a solution to the problem. The present invention provides for self-regulating application content downloads.

One aspect of the present invention is a system for self-regulating application content downloads. The system includes a content server, which has static and dynamic content. The server is configured to serve downloadable content (DLC) over a network. The system also includes a mobile communication device. The mobile device has a resident mobile application configured to manage storing and displaying the DLC on the device. The application is configured to determine if the mobile device is connected to a WiFI network or a cellular network, and also to determine the network's performance characteristics, such as delay and throughput. The application is also configured to utilize the performance characteristics and the type of network determined to select the quality and the quantity of DLC to download onto the mobile device from the content server.

The mobile communication device is preferably a mobile phone or a tablet computer.

If the application determines that the connected network is a WiFi network, the application preferably downloads all available DLC in the highest quality available from the content server.

Alternatively, if the application determines that the connected network is a WiFi network, the application downloads just the content that the user requests in the highest quality available.

Alternatively, if the application determines that the connected network is a WiFi network, the application downloads just the content that the user requests at the fastest speed possible.

Alternatively, if the application determines that the connected network is a WiFi network, the application downloads just the content based on user navigation patterns, which is personalized content.

If the application determines that the connected network is a cellular network, the application preferably downloads only the DLC that the user requests.

Alternatively, if the application determines that the connected network is a cellular network, the application downloads content based on user navigation patterns, which is personalized content.

Alternatively, if the application determines that the connected network is a cellular network, the application downloads just the lower quality content available.

Alternatively, if the application determines that the connected network is a cellular network, the application downloads just the lower quality personalized content that the user requests.

Another aspect of the present invention is a mobile communication device. The mobile communication device includes an antenna for receiving DLC over a network from a service. The mobile communication device also includes a mobile resident application on the mobile device. The application is configured to manage the storing and displaying of DLC, served by the service over a network, on the mobile device. The application is also configured to determine if the mobile device is connected to a WiFi network or a cellular network, and also to determine the network's performance characteristics, such as delay and throughput. The application is also configured to utilize the performance characteristics and the type of network determined to select the quality and the quantity of DLC to download onto the mobile device from the service.

Yet another aspect of the present invention is a method for self-regulating application content downloads. The method includes connecting a mobile communication device to a service over a wireless network. The mobile communication device includes a mobile resident application on the mobile device. The method also includes determining if the wireless network is a WiFI network or a cellular network. The method also includes determining the network's performance characteristics, such as delay and throughput. The method also includes utilizing the performance characteristics and the type of network determined to select the quality and the quantity of DLC to download onto the mobile device from the service.

Yet another aspect of the present invention is a system for self-regulating application content downloads with an end-user control. The system includes a content service, which includes DLC. The service is configured to serve the DLC over a network. The system also includes a mobile communication device. The mobile device includes a resident mobile application configured to manage the DLC served by the content service over a network. The application is configured to determine if the mobile device is connected to a WiFI network or a cellular network, and also to determine the network's performance characteristics, such as delay and throughput. The application is also configured to utilize the performance characteristics and the type of network determined to allow an end-user to select the quality and the quantity of DLC to download onto the mobile device from the service.

Yet another aspect of the present invention is a mobile communication device. The mobile communication device includes an antenna for receiving DLC over a network from a service. The mobile communication device also includes a mobile resident application on the mobile device. The application is configured to manage the DLC served by the content service over a network. The application is also configured to determine if the mobile device is connected to a WiFi network or a cellular network, and also to determine the network's performance characteristics, such as delay and throughput. The application is also configured to utilize the performance characteristics and the type of network determined to allow an end-user to select the quality and the quantity of DLC to download onto the mobile device from the service.

Yet another aspect of the present invention is a method for self-regulating application content downloads with an end-user control. The method includes connecting a mobile communication device to a service over a wireless network. The mobile communication device includes a mobile resident application on the mobile device. The method also includes determining if the wireless network is a WiFi network or a cellular network. The method also includes determining the wireless network's performance characteristics, such as delay and throughput. The method also includes utilizing the performance characteristics and the type of network determined to allow an end-user to select the quality and the quantity of DLC to download onto the mobile device from the service.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
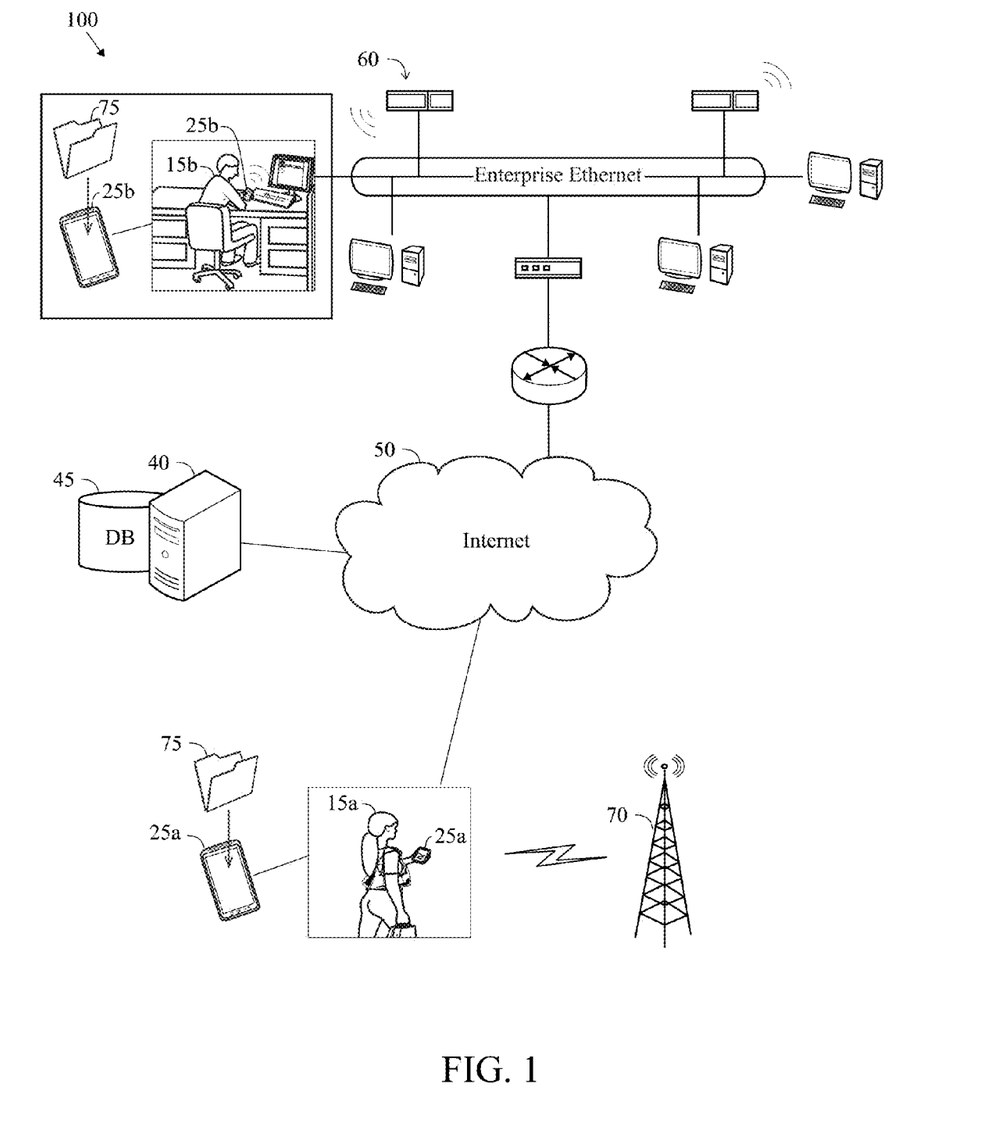
FIG. 1 is a block diagram of a system for self-regulating application content downloads.

A system 100 for self regulating content downloads is shown in FIG. 1. A content server 40 comprises a database 45 of static content and dynamic content. The server 40, or service, is configured to serve downloadable content over a network to mobile communication devices 25 that have a resident application 75 for self-regulating content downloads. A first end user 15a is walking and can receive her content download over a cellular network 70. Another end user 15b at his desk in his office obtains downloads over a WiFi network 60 through his company.

Figure 2:
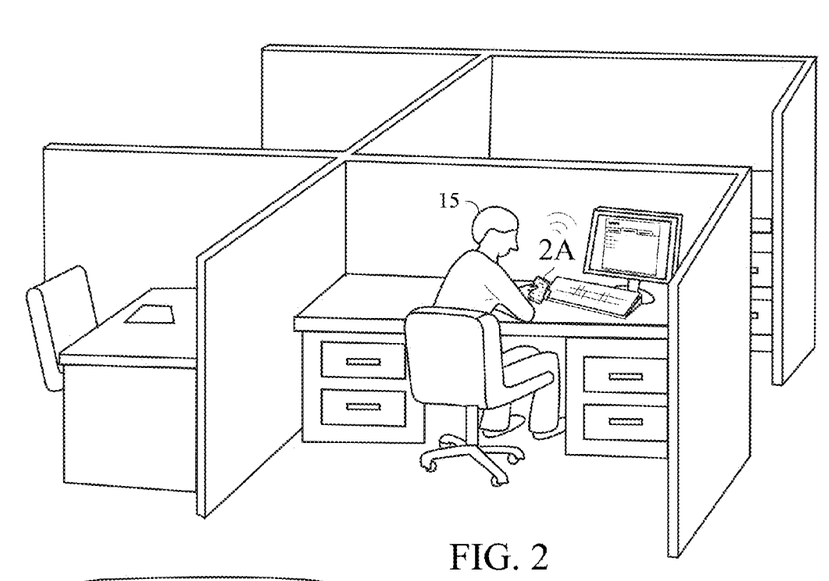
FIG. 2 is an illustration of an end user obtaining downloads from a WiFi network at the highest quality and highest content.
Figure 2A:
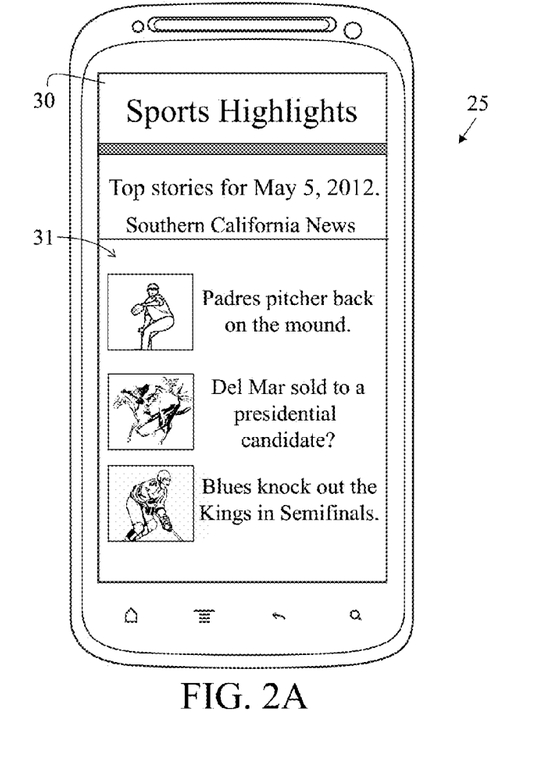
FIG. 2A is an isolated view of a mobile phone with an application for self-regulating application content downloads operating in a highest quality and highest content WiFi download mode.

As shown in FIGS. 2 and 2A, the content downloaded to the end user 15 at his desk over the WiFi 60 is of the highest quality and greatest quantity, as shown as content 31 on a display 30 of a mobile communication devices 25.

Figure 3:
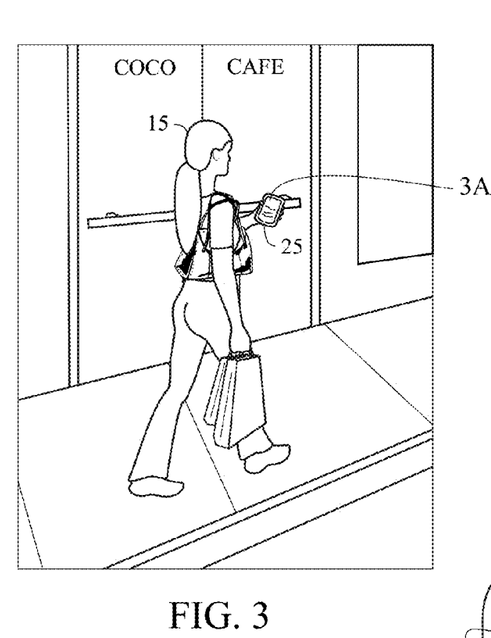
FIG. 3 is an illustration of an end user obtaining downloads from a cellular at the lowest quality and lowest content.
Figure 3A:
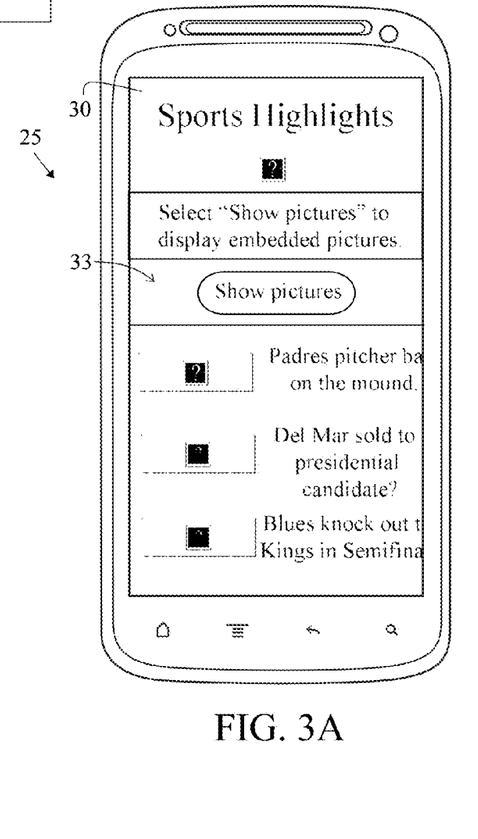
FIG. 3A is an isolated view of a mobile phone with an application for self-regulating application content downloads operating in a lowest quality and lowest content cellular network download mode.

As shown in FIGS. 3 and 3A, the content downloaded over the cellular network 70 to the mobile phone 25 of the end user 15 walking down a street is of the lowest quality and lowest quantity.

The mobile resident application 75 is able to determine whether the wireless network is WiFi or a cellular network using several methods. One method is to query the mobile communication device 25. The mobile resident application 75 determines if SSID (Service Set Identification) is utilized or if a MAC address is for a cellular radio or WiFi radio of the mobile communication device 25. Alternatively, the mobile resident application 75 determines the download speed (throughput) of the network. The mobile resident application 75 samples the content download rate, preferably in a continuous manner, to determine the quality and quantity of content to be downloaded to the mobile communication device 25. The mobile resident application 75 then directs the content to be downloaded to the mobile communication device 25 in the most appropriate manner based on the network download rate. For example, the mobile resident application 75 will determine that a LTE network download rate in the middle of the Las Vegas strip is higher than a DSL download rate at an end-user's home.

Figure 6:
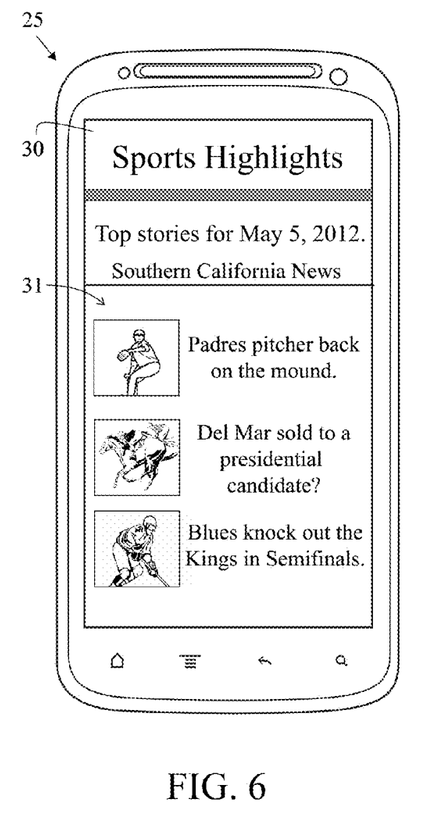
FIG. 6 is an isolated view of a mobile phone with an application for self-regulating application content downloads operating in a medium quality and highest quantity WiFi download mode.
Figure 6A:
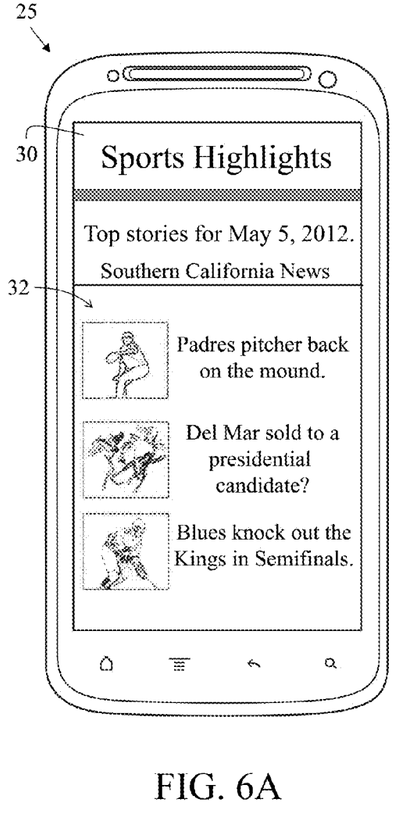
FIG. 6A is an isolated view of a mobile phone with an application for self-regulating application content downloads operating in a medium quality and medium quantity WiFi download mode.

As shown in FIGS. 6 and 6A, the level of content delivery over a WiFi network 60 varies from a medium quality and highest quantity WiFi network download mode, as shown 32 on a display 30, to a medium quality and medium quantity WiFi network download mode, to a highest quality and highest quantity WiFi network download mode, as shown 31 on a display 30. Those skilled in the pertinent art will recognize that other levels of content delivery are possible for WiFi networks without departing from the scope and spirit of the present invention. Further, if the mobile application determines that the WiFi network is associated with the mobile application (e.g., a casino application that is associated with a casino, and the WiFi network is at the casino), then the download is at the highest possible quality with minimal safeguards since the application recognizes the WiFi network.

Figure 7:
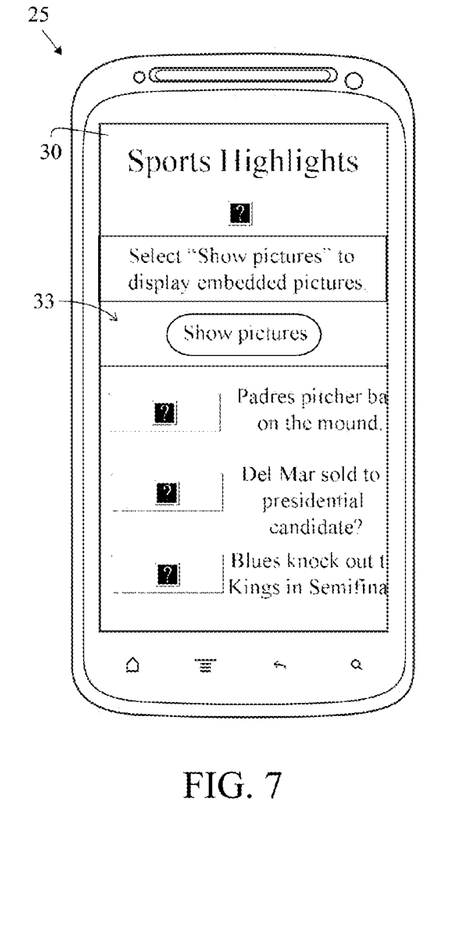
FIG. 7 is an isolated view of a mobile phone with an application for self-regulating application content downloads operating in a medium quality and lowest quantity cellular network download mode.
Figure 7A:
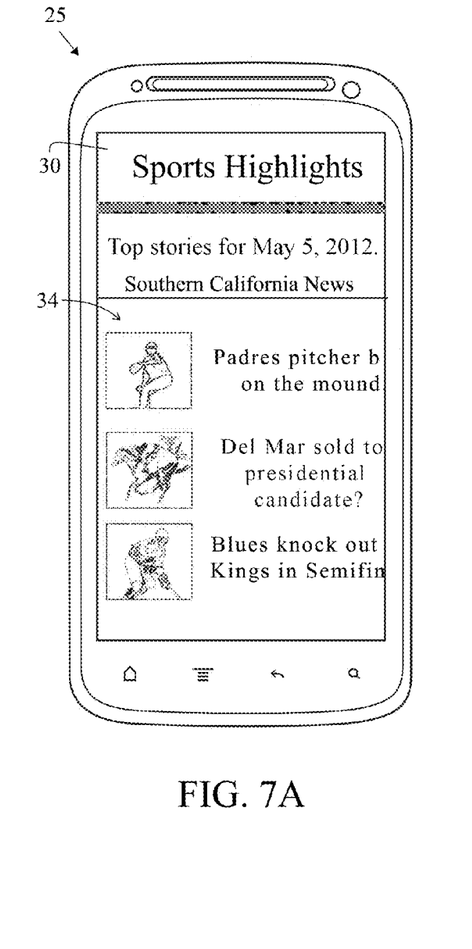
FIG. 7A is an isolated view of a mobile phone with an application for self-regulating application content downloads operating in a medium quality and medium quantity cellular network download mode.

As shown in FIGS. 7 and 7A, the level of content delivery over the cellular network 70 varies from a medium quality and lowest quantity cellular network download mode, to a medium quality and medium quantity cellular network download mode, as shown 34 on a display 30, to a lowest quality and lowest quantity cellular network download mode, as shown 33 on a display 30. Those skilled in the pertinent art will recognize that other levels of content delivery are possible for cellular networks without departing from the scope and spirit of the present invention.

The mobile communication devices utilized with the present invention preferably include mobile phones, smartphones, tablet computers, PDAs and the like. Examples of smartphones include the IPHONE® smartphone from Apple, Inc., BLACKBERRY® smartphones from Research In Motion, the DROID® smartphone from Motorola Mobility Inc., and many more. Examples of tablet computing devices include the IPAD® tablet from Apple Inc., and the XOOM™ tablet from Motorola Mobility Inc.

A typical mobile communication device includes an accelerometer, a head phone, a microphone, a speak, a GPS chipset, a Bluetooth component, a WiFi component, a 3G/4G component, a BaseBand Processor (for radio control), an applications processor, a JTAG (debugger, a SDRAM memory, a Flash memory, SIM card, LCD display, a camera, a power management circuit and a battery or power source.

Most of the interface descriptions preferably disclose use of at least one communication protocol to establish handshaking or bi-directional communications. These protocols preferably include but are not limited to XML, HTTP, TCP/IP, Serial, UDP, FTP, Web Services, WAP, SMTP, SMPP, DTS, Stored Procedures, Import/Export, Global Positioning Triangulation, IM, SMS, MMS, GPRS and Flash. The databases used with the system preferably include but are not limited to MSSQL, Access, MySQL, Progress, Oracle, DB2, Open Source DBs and others. Operating system used with the system preferably include Microsoft 2010, XP, Vista, 200o Server, 2003 Server, 2008 Server, Windows Mobile, Linux, Android, Unix, I series, AS 400 and Apple OS.

The underlying protocol at a server, is preferably Internet Protocol Suite (Transfer Control Protocol/Internet Protocol ("TCP/IP")), and the transmission protocol to receive a file is preferably a file transfer protocol ("FTP"), Hypertext Transfer Protocol ("HTTP"), Secure Hypertext Transfer Protocol ("HTTPS") or other similar protocols. The transmission protocol ranges from SIP to MGCP to FTP and beyond. The protocol at the server is preferably HTTPS.

A mobile communication service provider (aka phone carrier) of the customer such as VERIZON, AT&T, SPRINT, T-MOBILE, and the like mobile communication service providers, provide the communication network for communication to the mobile communication device of the end user.

Figure 4:
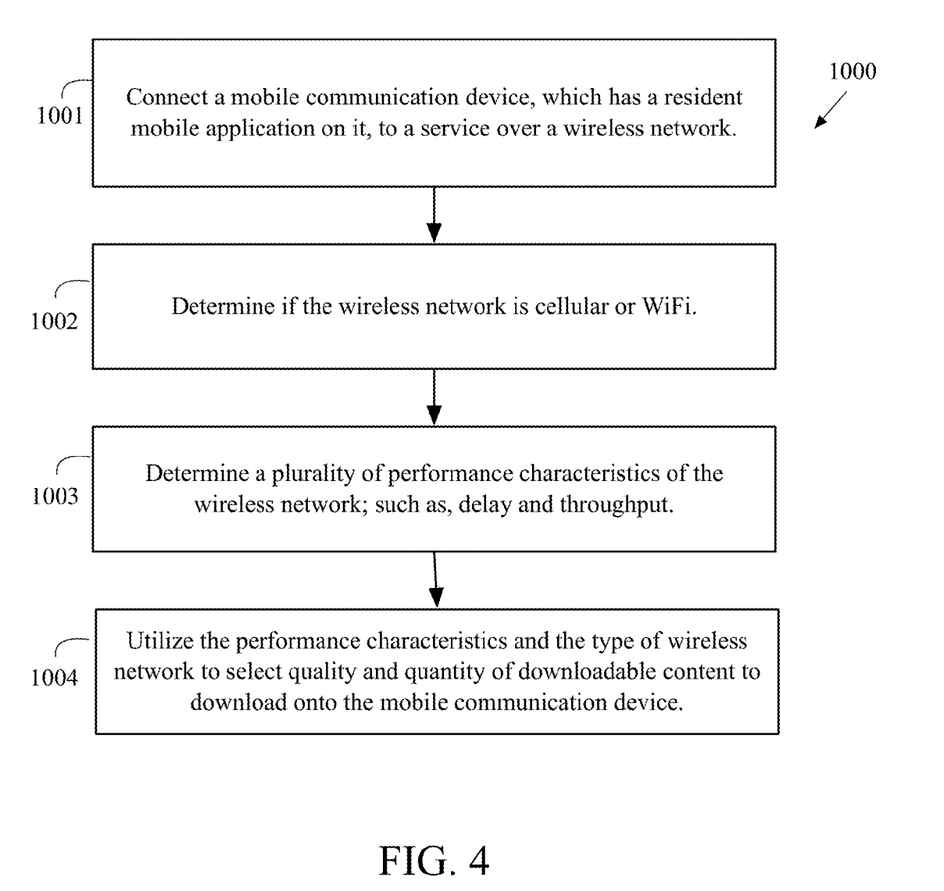
FIG. 4 is a flow of a method for self-regulating application content downloads.

A flow chart for a method 1000 is shown in FIG. 4. At block 1001, a mobile communication device, such as a tablet PC or a mobile phone, with a mobile application installed on it is connected to a service via a wireless network. The application determines whether the wireless network is WiFi or a cellular network at block 1002. Then at block 1003, the application determines performance characteristics of the wireless network, such as, delay and throughput. The quality and quantity of content to be downloaded onto the mobile device is then based on network congestion, packet loss handling, and other performance characteristics and the type of wireless network connection, as shown at block 1004.

Figure 5:
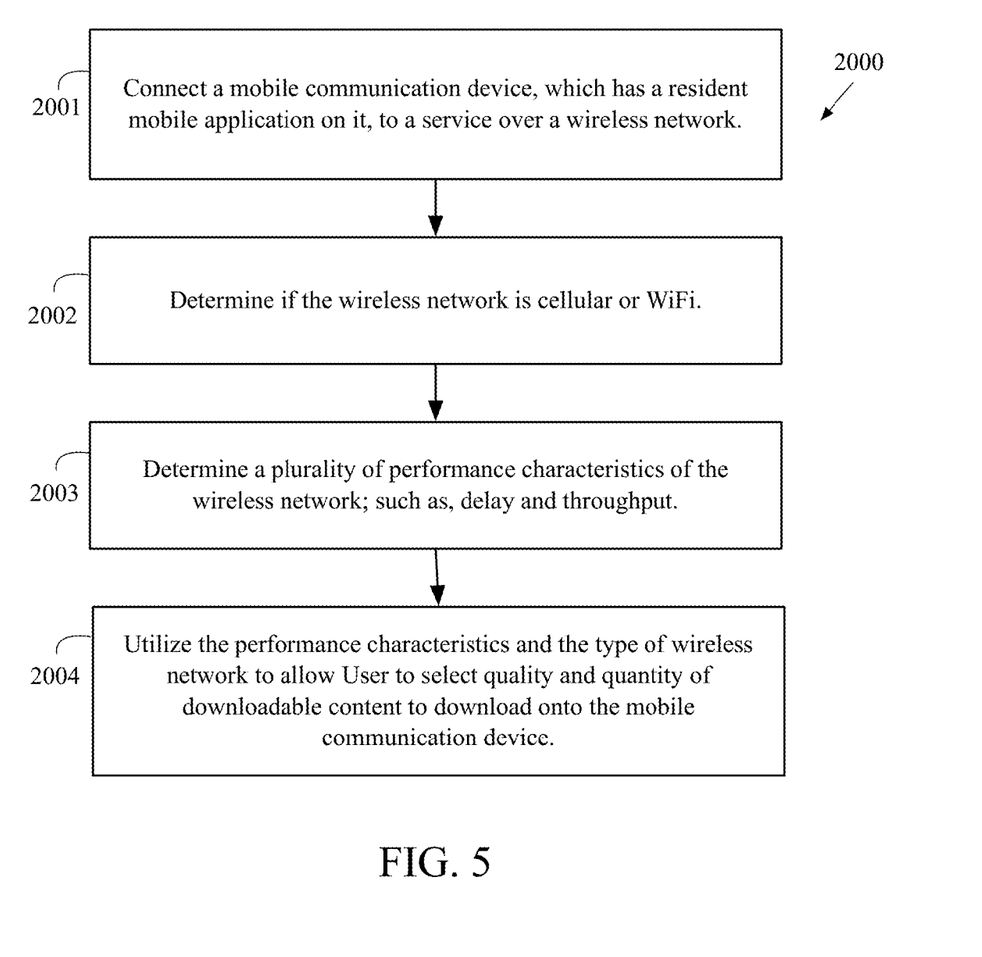
FIG. 5 is a flow chart of a method for self-regulating application content downloads with end user control.

A flow chart for a method 2000 is shown in FIG. 5. At block 2001, a mobile communication device, such as a tablet PC or a mobile phone, with a mobile application installed on it is connected to a service via a wireless network. The application determines whether the wireless network is WiFi or a cellular network at block 2002. Then at block 2003, the application determines performance characteristics of the wireless network, such as, delay and throughput. The user then selects the quality and quantity of content to download onto the mobile communication device, based on the application's analysis of network congestion, packet loss handling, and other performance characteristics and the type of wireless network connection, as shown at block 2004.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A system for self-regulating application content download, the system comprising:
   a content server comprising static content and dynamic content, the server configured to serve downloadable content over a network;
   a mobile communication device configured to manage the storage and display on the mobile communication device downloadable content served by the content server over a network, the mobile communication device configured to determine if the mobile communication device is connected to a WiFi network or a cellular network by determining if service set identification is utilized or if a MAC address is utilized for the connection between the wireless network and the mobile communication device, the mobile application configured, to determine a plurality of performance characteristics of the connected network comprising at least delay and throughput, and configured to utilize the plurality of performance characteristics and the type of connected network to select downloadable content to download from the content server to the mobile communication device;
   wherein if the mobile communication device determines that the connected network is a WiFi network, the mobile communication device downloads all available downloadable content from the content server, and wherein if the mobile communication device determines that the connected network is a cellular network the mobile communication device downloads only downloadable content requested by a user from the content server.

2. The system according to claim 1 wherein if the mobile communication device determines that the connected network is a cellular network the mobile application downloads only downloadable personalized content from the content server.

3. The system according to claim 1 wherein the mobile communication device determines that the connected network is a WiFi network associated with the mobile communication device and all available downloadable content is downloaded from the content server over the WiFi network.

4. A method for self-regulating application content download, the method comprising:
   connecting a mobile communication device to a service over a wireless network;
   determining if the wireless network is a cellular network or a WiFi network by determining if service set identification is utilized or if a MAC address is utilized for the connection between the wireless network and the mobile communication device;
   determining a plurality of performance characteristics of the wireless network, the plurality of performance characteristics comprising at least delay and throughput of the wireless network; and utilizing the plurality of performance characteristics and the type of wireless network to select downloadable content to download from the service to the mobile communication device;

wherein if the mobile communication device determines that the connected network is a WiFi network, the mobile communication device downloads all available downloadable content from the service, and wherein if the mobile communication device determines that the connected network is a cellular network the mobile communication device downloads only downloadable content requested by a user from the service.

\* \* \* \* \*